United States Patent
Pursifull et al.

(10) Patent No.: US 7,918,207 B2
(45) Date of Patent: Apr. 5, 2011

(54) FUEL DELIVERY SYSTEM FOR MULTI-FUEL ENGINE

(75) Inventors: Ross Dykstra Pursifull, Dearborn, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

(21) Appl. No.: 12/348,191

(22) Filed: Jan. 2, 2009

(65) Prior Publication Data

US 2010/0170470 A1   Jul. 8, 2010

(51) Int. Cl.
*F02B 3/10* (2006.01)
*F02B 3/00* (2006.01)

(52) U.S. Cl. .................. 123/300; 123/299

(58) Field of Classification Search ............. 123/431, 123/299, 300, 304, 575–578, 1 A, 27 GE, 123/478, 480; 701/101, 102
See application file for complete search history.

(56) References Cited

U.S. PATENT DOCUMENTS

| | | | |
|---|---|---|---|
| 5,735,253 A * | 4/1998 | Perotto et al. | 123/406.47 |
| 6,543,423 B2 | 4/2003 | Dobryden et al. | |
| 6,845,608 B2 | 1/2005 | Klenk et al. | |
| 6,951,210 B2 * | 10/2005 | Landi et al. | 123/525 |
| 7,316,218 B2 | 1/2008 | Ito | |
| 7,357,101 B2 | 4/2008 | Boyarski | |
| 2002/0007805 A1 * | 1/2002 | Green | 123/27 GE |
| 2008/0006246 A1 * | 1/2008 | Perryman et al. | 123/480 |

* cited by examiner

*Primary Examiner* — Mahmoud Gimie
(74) *Attorney, Agent, or Firm* — Allan J. Lippa; Alleman Hall McCoy Russell & Tuttle LLP

(57) ABSTRACT

A fuel delivery system for an engine is described. The system includes a controller for adjusting injection timing when switching between two injectors of a cylinder. The system can improve engine air-fuel control when switching between two injectors of a cylinder.

20 Claims, 5 Drawing Sheets

FUEL DELIVERY SYSTEM FOR MULTI-FUEL ENGINE

BACKGROUND SUMMARY

Some fuel combusting engines may utilize two or more different fuels to provide performance benefits over a variety of different operating conditions. For example, some engines may include a fuel system that includes separate liquid and gaseous fuel injectors for each cylinder of the engine. Each of these fuel injectors may be driven by a corresponding electronic driver to cause fuel to be injected to the cylinder in response to the operating conditions of the engine.

The inventors herein have recognized a disadvantage of the above approach. Namely, the inventors herein have recognized that control circuitry and wiring utilized with a dual injector enabled engine may substantially increase the cost and complexity of the fuel system. To address these and other issues, the inventors herein have provided a fuel delivery system for an engine and a method of its operation, whereby a plurality of fuel injectors of a given cylinder may be driven via a common electronic driver while also enabling operation of only a selected one of the plurality of fuel injectors at a given instance.

As a non-limiting example, the fuel delivery system includes a first fuel injector configured to deliver a first fuel to a first cylinder of the engine; a second fuel injector configured to deliver a second fuel to the first cylinder of the engine; an electrical relay system disposed between a first electrical potential and each of the first fuel injector and the second fuel injector; an electronic driver disposed between a second electrical potential and each of the first fuel injector and the second fuel injector; and a control module. The control module may be configured to switch the electrical relay system to a first position to select the first fuel for delivery to the engine, where the first position electrically couples the first electrical potential to the first fuel injector; switch the electrical relay system to a second position to select the second fuel for delivery to the engine, where the second position electrically couples the first electrical potential to the second fuel injector; and close the electronic driver to deliver the selected one of the first fuel or the second fuel to the first cylinder via a respective one of the first fuel injector or the second fuel injector.

Furthermore, the inventors herein have provided several approaches for transitioning this fuel delivery system between a first mode where a first injector is operated to deliver fuel to the cylinder and a second mode where a second injector is operated to deliver fuel to the cylinder of the engine, while also maintaining a prescribed air-fuel ratio throughout the transition. As a non-limiting example, a transition between these two modes may be performed during a time period when none of the fuel injectors associated with the electrical relay system are performing a fuel injection. As another example, a transition between these two modes may be performed while a fuel injection is being performed by adjusting a fuel injection rate or fuel injection pulse-width of at least one of the two fuel injectors relative to the other fuel injector to reduce fueling errors that may otherwise occur as a result of the transition.

DETAILED DESCRIPTION

Figure 1:
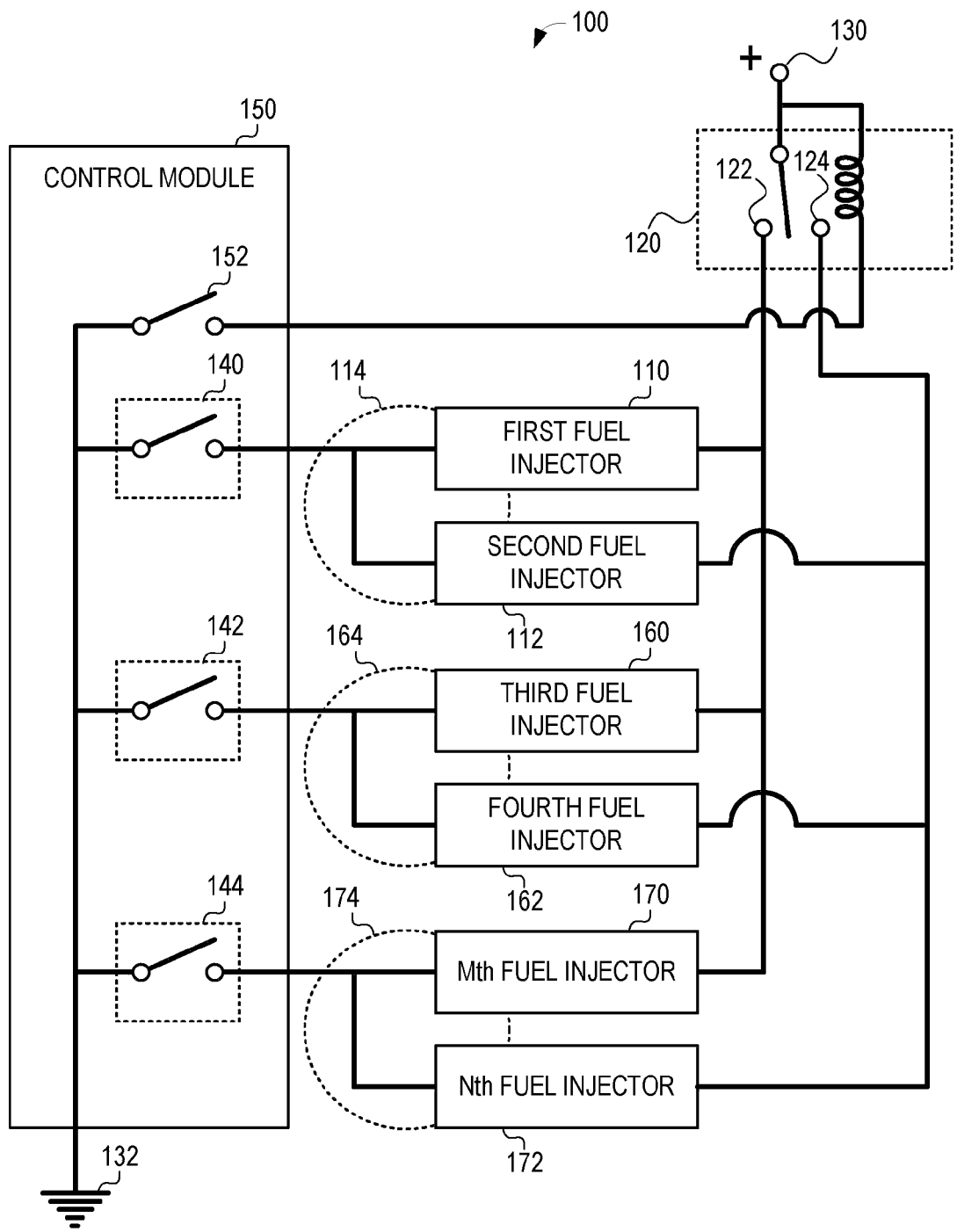
FIG. 1 shows an example embodiment of a fuel delivery system.

FIG. 1 shows an example embodiment of a fuel delivery system 100. Fuel delivery system 100 may form part of an engine system, a non-limiting example of which is shown in greater detail in FIG. 2. Fuel delivery system 100 includes a first fuel injector 110, which may be configured to deliver a first fuel to a first cylinder of the engine represented schematically at 114. Fuel delivery system 100 further includes a second fuel injector 112, which may be configured to deliver a second fuel to the first cylinder of the engine.

Figure 2:
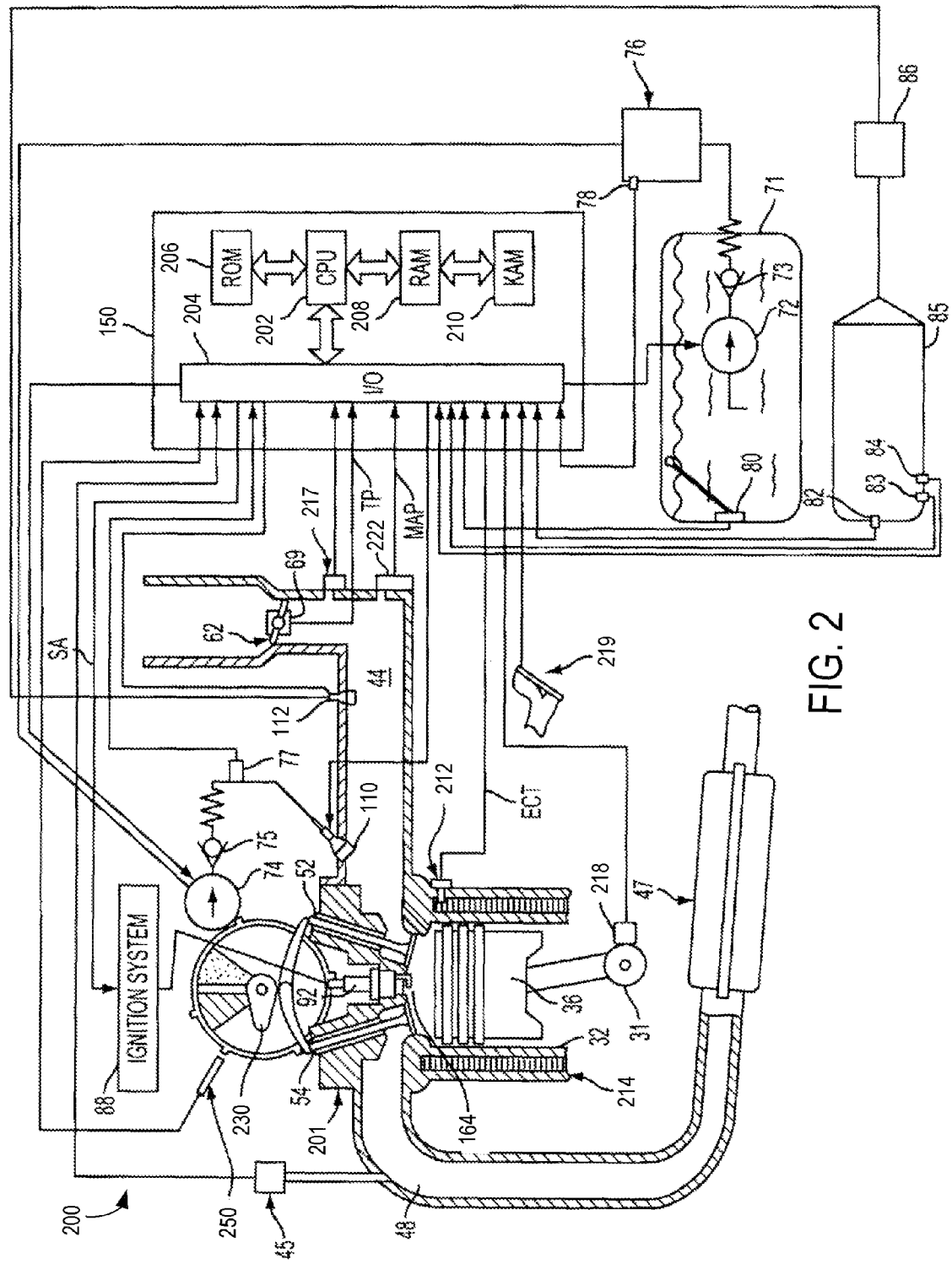
FIG. 2 shows an example embodiment of an engine system.

In some embodiments, both the first fuel injector and the second fuel injector are configured as port fuel injectors that are arranged at an intake port of the first cylinder as shown schematically in FIG. 2. In other embodiments, one of the first fuel injector and the second fuel injector may be arranged at the intake port of the cylinder and the other fuel injector may be configured as a direct fuel injector that is arranged at or in the first cylinder to deliver fuel directly thereto. In still other embodiments, both the first fuel injector and the second fuel injector may be configured as direct fuel injectors arranged at or in the first cylinder to deliver fuel directly thereto.

In some embodiments, the first fuel injector is configured to inject a liquid fuel and the second fuel injector is configured to inject a gaseous fuel. As a non-limiting example the first fuel may include gasoline and the second fuel may include natural gas. It should be understood that other suitable fuels may be used including liquid or gaseous hydrocarbon based fuels or alcohol based fuels, among others. In other embodiments, both the first fuel injector and the second fuel injector are configured to inject one of a liquid fuel or a gaseous fuel or a combination thereof. In other embodiments, the first fuel injector and the second fuel injector may be configured to inject the same fuel type to different locations of the engine. For example, the first fuel injector may be configured to inject a first fuel to an intake port of the first cylinder and the second fuel injector may be configured to inject the first fuel directly into the first cylinder. Although, it should be understood that the paired first and second injectors may serve different cylinders in some embodiments. For example, having the first and second fuel injectors serve differing cylinders may accommodate differing fuel injection angular windows.

Fuel delivery system 100 may further include an electrical relay system 120 disposed between a first electrical potential 130 and each of the first fuel injector 110 and the second fuel injector 112. Fuel delivery system 100 may further include an electronic driver 140 disposed between a second electrical potential 132 and each of the first fuel injector 110 and the second fuel injector 112.

In some embodiments, a second electronic driver that resides external the control module may be placed in series with one of the cylinder's injectors. For example, fuel injectors 112, 162, and 172 may each comprise an external injector driver and injector. As a non-limiting example, this injector driver may include an external peak and hold injector driver, such as the external Peak & Hold Injector Driver module manufactured by AEM. This type of external peak and hold injector driver allows the control module to utilize a saturated injector drive circuit to trigger low impedance injectors with a true 4/1 Peak & Hold injector drive circuit. For example, AEM's Peak & Hold Injector Driver contains 10 independent injector drive channels. Each channel supplies full battery voltage to a fuel injector for rapid current rise, in order to produce positive injector opening. When load current reaches a first value (e.g. 4.1 A (amps)), the injector driver reduces the load current to a second value (e.g., 1.1 A), and operates as a constant current source. This condition holds the injector open, and reduces system power dissipation. If the current fails to reach this first value within a prescribed time period (e.g., 5 mS), the driver module may be configured to reduce the load current to the second value (e.g., 1.1 A). In this embodiment, the injector trigger wires may be connected from the control module to the external driver module, and then the output wires from the module may be connected to the fuel injectors. Any suitable number of channels can be used from 1 to 10. In this way, an injector not otherwise compatible with the control module's internal injector driver may be used in combination with this type of external electronic driver to accommodate the injector.

In some embodiments, first electrical potential 130 is a voltage source and second electrical potential 132 is ground. In this embodiment, electrical relay system 130 is a high side relay system disposed between the voltage source and a high side of each of first fuel injector 110 and second fuel injector 112, and electronic driver 140 is a low side driver disposed between the ground and a low side of each of the first fuel injector and the second fuel injector. In other embodiments, the first electrical potential is ground and the second electrical potential is a voltage source. In yet another embodiment, the first electrical potential is a first voltage source and the second electrical potential is a second voltage source that is different than the first voltage source.

Fuel delivery system 100 may further include a control module 150. In some embodiments, electronic driver 140 may form part of control module 150. The control module may be configured to perform one or more processes or methods, which will be described in greater detail with respect to FIG. 3. In some embodiments, the control module may be configured to switch electrical relay system 120 via switch 152. As a non-limiting example, control module may be configured to switch electrical relay system 120 to a first position 122 to select the first fuel for delivery to the engine. The first position, when selected by the control module, electrically couples the first electrical potential to the first fuel injector. The control module may be further configured to switch the electrical relay system to a second position 124 to select the second fuel for delivery to the engine. In this example embodiment, the second position, when selected by the control module, electrically couples the first electrical potential to the second fuel injector.

In some embodiments, selection of first position 122 further uncouples first electrical potential 130 from second fuel injector 112, and selection of second position 124 further uncouples first electrical potential 130 from first fuel injector 110. In some embodiments, electrical relay system 130 is configured as a single pole double throw switch. In some embodiments, electrical relay system includes a first relay switch disposed between the first electrical potential and the first fuel injector, and a second relay switch disposed between the first electrical potential and the second fuel injector as will be described in greater detail with reference to FIG. 6. In this embodiment, the first position for selecting the first fuel includes or is selected by closing the first relay switch to electrically couple the first electrical potential to the first fuel injector, and the second position for selecting the second fuel includes or is selected by closing the second relay switch to electrically couple the first electrical potential to the second fuel injector.

In some embodiments, use of a mechanical relay for 120 may be or transition delay is insignificant compared to the fuel injection pulsewidth. For example, the delay time between the command and the switch may be 2 to 5 milliseconds. It should be understood that a solid state relay may also be used.

The control module may be further configured to close electronic driver 140 to deliver the selected one of the first fuel or the second fuel to the first cylinder via a respective one of the first fuel injector or the second fuel injector. Upon closing of the electronic driver 140 both the first fuel injector and second fuel injector are electrically coupled to second electrical potential 132 causing fuel to be injected via the selected one of the first fuel injector or the second fuel injector that is electrically coupled to first electrical potential 130 via electrical relay system 120. The control module may be configured to open electronic driver 140 to terminate delivery of the selected one of the first fuel or the second fuel to the first cylinder via the respective one of the first fuel injector 110 or the second fuel injector 112.

Figure 3:
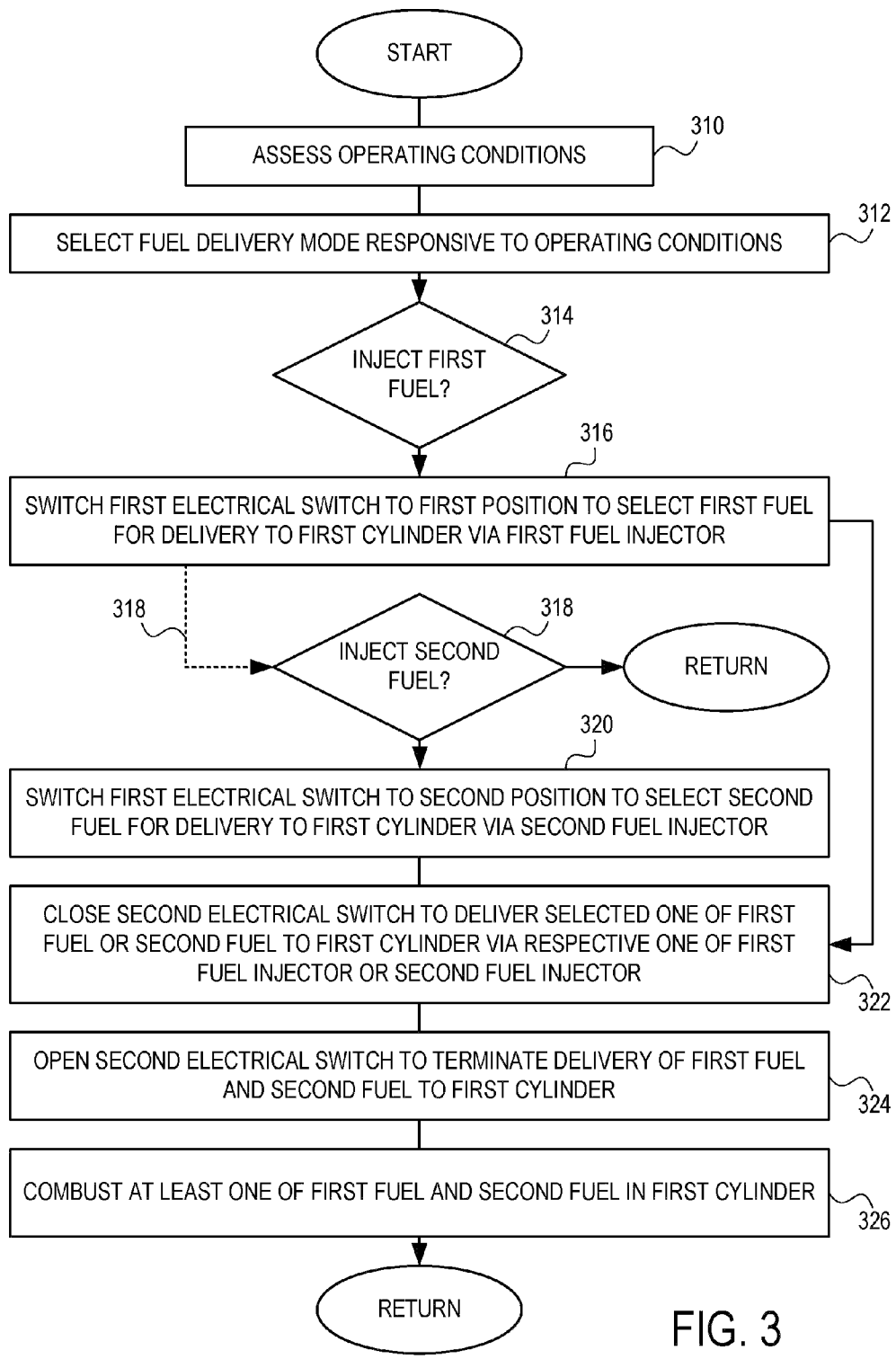
FIGS. 3-5 are flow charts depicting example methods of operating a fuel delivery system for an engine.
Figure 4:
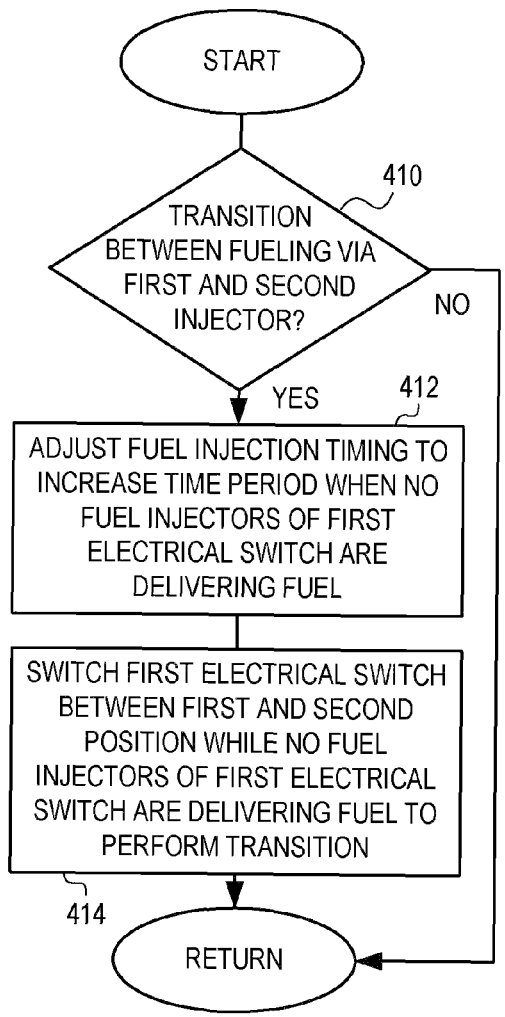
Figure 5:
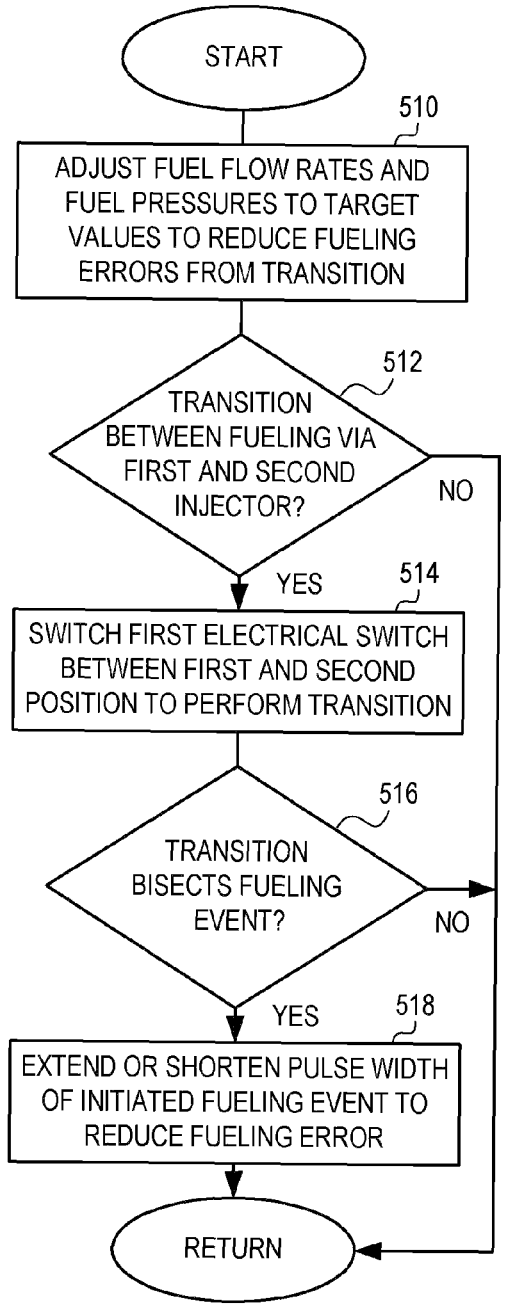

As described in greater detail with respect to FIGS. 3-5, the control module may be configured to vary the fuel type that is combusted in the first cylinder between the first fuel and second fuel responsive to an operating condition of the engine by switching the electrical relay system between the first position and the second position. The operating condition may include one or more of engine load, engine speed, engine temperature, and a relative availability of the first fuel and the second fuel for delivery to the engine, among other suitable operating conditions. In some embodiments, a fueling schedule may be selected to increase or maximize power, reduce or minimize fuel cost, and/or increase or maximize valvetrain life, among other suitable objectives.

In some embodiments, each of first fuel injector 110 and second fuel injector 112 may be configured as saturating type fuel injectors. In some embodiments, electronic driver 140 may further include a saturating type driver including a transistor for opening and closing an electrical coupling between second electrical potential 132 and each of first fuel injector 110 and the second fuel injector 112. In other embodiments, one or more of the first fuel injector and the second fuel injector may be configured as peak and hold type fuel injectors, whereby the electronic driver may accordingly include a peak and hold type driver.

Fuel delivery system 100 may further include other fuel injectors and associated drivers for other cylinders of the engine as described with reference to the first cylinder. For example, fuel delivery system 100 may include a third fuel injector 160 configured to deliver the first fuel to a second cylinder 164 of the engine, a fourth fuel injector 162 configured to deliver the second fuel to the second cylinder of the engine, and a second electronic driver 142 disposed between second electrical potential 132 and each of the third fuel injector and the fourth fuel injector.

In some embodiments, electrical relay system 130 is further disposed between first electrical potential 130 and other fuel injectors of the engine. For example, the electrical relay system may be further disposed between each of third fuel injector 160 and fourth fuel injector 162, whereby first position 122 of electrical relay system 120, when selected, electrically couples first electrical potential 130 to third fuel injector 160, and second position 124, when selected, electrically couples first electrical potential 130 to fourth fuel injector 162. In this way, the control module may be further configured to close the second electronic driver to deliver the selected one of the first fuel or the second fuel to the second cylinder via a respective one of the third fuel injector or the fourth fuel injector as was previously described with reference to the first cylinder of the engine.

It should be understood that fuel delivery system 100 may include any suitable number of fuel injectors and associated electronic drivers for other cylinders of the engine. For example, fuel delivery system 100 may include an Mth fuel injector for delivering the first fuel to an Nth cylinder 174 of the engine, and may include an Nth fuel injector for delivering the second fuel to an Nth cylinder of the engine. An electronic driver 144 may be provided for electrically coupling the Mth and Nth fuel injectors to second electrical potential 132, while Mth and Nth fuel injectors may communicate with first electrical potential 130 via respective positions 122 and 124 of electrical relay system 120. Operation of the Mth and Nth fuel injectors may be performed in a similar manner as described with reference to first fuel injector 110 and second fuel injector 112. In this way, fuel delivery system 100 may control any suitable number of fuel injectors via a common electrical relay system.

FIG. 2 shows an example embodiment of an engine system 200 including an internal combustion engine 201, which may optionally form part of a vehicle powertrain. Internal combustion engine 201 includes a plurality of cylinders, one cylinder of which is shown in FIG. 1 as combustion chamber 164. Combustion chamber 164 is defined by cylinder walls 32 and piston 36. Piston 36 is connected to crankshaft 31. Combustion chamber 164 is communicates with intake manifold 44 and exhaust manifold 48 via respective intake valve 52 an exhaust valve 54. Each intake and exhaust valve is operated by a mechanically drive cam 130. Alternatively, intake valves and/or exhaust valves may be operated by one or more electrically actuated valves. Intake manifold 44 is shown communicating with electronic throttle 62.

Fuel may be delivered to engine 201 utilizing a number of suitable approaches. In some embodiments, a gaseous fuel (e.g., compressed natural gas (CNG), propane, and fuels that assume a vapor state near ambient temperature and pressure) may be injected to intake manifold 44 (e.g., at the intake port of combustion chamber 164) by way of injector 112 or alternatively directly into the cylinder. Gaseous fuel injector 112 is supplied fuel from storage tank 85 by way of pressure regulator 86. Fuel is stored in tank 85 at a first fuel pressure that varies as the amount of fuel stored in the fuel tank varies. The first fuel pressure is reduced to a second pressure at regulator 86 before the fuel is delivered to engine 201. If desired, propane or heated gasoline may be injected in either a gaseous or liquid state. The fuels can be injected as a liquid when the fuel pressure is above roughly 700 kPa and as a gas when the fuel pressure is below roughly 700 kPa.

In the illustrated embodiment, liquid fuel can also be injected to intake manifold 44 (e.g., at the intake port of combustion chamber 164) by way of injector 110. Alternatively, fuel may be injected directly into the cylinder, if desired. The amount of fuel delivered is proportional to the pulse width of signal sent to the fuel injector from control module 150. Fuel is delivered to fuel injector 110 by injection pump 74. The injection pump may be mechanically driven by the engine or electrically driven. Check valve 75 allows fuel flow from injection pump 74 to fuel injector 66 and limits flow from fuel injector 66 to injection pump 74. Lift pump 72 provides fuel from fuel tank 71 to fuel injection pump 74. Lift pump 72 may be electrically or mechanically driven. Check valve 73 allows fuel to flow from fuel pump 72 and limits fuel flow backwards into fuel pump 72. Pressure accumulator 76 may be configured to hold a volume of fuel that reduces the rate of fuel pressure increase or decrease between fuel pump 72 and fuel injection pump 74. The volume of accumulator 76 may be sized such that engine 10 can operate at idle conditions for a predetermined period of time between operating intervals of fuel pump 72. For example, accumulator 76 can be sized such that when engine 201 idles, it takes one or more minutes to deplete pressure in accumulator 76 to a level at which fuel pump 74 is incapable of maintaining a desired pressure to fuel injector 66. Note that the lift pump and/or injection pumps described above may be electrically, hydraulically, or mechanically driven without departing from the scope or breadth of the present description.

Distributor-less ignition system 88 provides ignition spark to combustion chamber 164 via spark plug 92 in response to control module 150. Universal Exhaust Gas Oxygen (UEGO) sensor 45 is shown coupled to exhaust manifold 48 upstream of catalytic converter 47. Converter 47 can include multiple catalyst bricks, in one example. In another example, multiple emission control devices, each with multiple bricks, can be used. Converter 47 can be a three-way type catalyst in one example.

Control module 150 is shown in FIG. 2 as a conventional microcomputer including: microprocessor unit 202, input/output ports 204, and read-only-memory 206, random-access-memory 208, Keep-alive-memory 210, and a conventional data bus. Control module 150 is shown receiving various signals from sensors coupled to engine system 200, in addition to those signals previously discussed, including: engine coolant temperature (ECT) from temperature sensor 212 coupled to water jacket 214; a position sensor 219 coupled to a accelerator pedal; a measurement of engine manifold pressure (MAP) from pressure sensor 222 coupled to intake manifold 44; a fuel rail pressure sensor 77; engine knock sensor (not shown); fuel amount (level) sensor 80; fuel amount (pressure) sensor 82; sonic gas sensor 83; gas temperature sensor 84; cam position sensor 250; optional accumulator fuel pressure sensor 78; a throttle position sensor 69; a measurement (ACT) of engine air amount temperature or manifold temperature from temperature sensor 217; a engine position sensor from a Hall effect sensor 218 sensing crankshaft 31 position; and power driver circuitry capable of providing actuating energy to actuate valves as well as capability to provide current for heating valve actuators. In one aspect of the present description, engine position sensor 218 produces a predetermined number of equally spaced pulses every revolution of the crankshaft from which engine speed (RPM) can be determined.

Storage medium read-only memory 206 can be programmed with computer readable data representing instructions executable by processor 202 for performing the methods described below as well as other variants that are anticipated but not specifically listed.

FIG. 3 is a flow chart depicting an example embodiment of a method of operating a fuel delivery system for an engine. As a non-limiting example, the method of FIG. 3 may be applied to fuel delivery system 100 of FIG. 1, and may be used in the context of engine system 200 of FIG. 2.

At 310, the method may include assessing operating conditions. These operating conditions may include, but are not limited to, one or more of the following: engine load, engine speed, engine temperature, and a relative availability of the first fuel and the second fuel for delivery to the engine, among other suitable operating conditions. For example, the control module described in FIG. 2 may assess one or more operating conditions via the various sensors described with reference to engine system 200.

At 312, the method may include selecting a fuel delivery mode responsive to the operating conditions assessed at 310. In some embodiments, the control module may select a first fuel delivery mode to cause the delivery of the first fuel during a first operating condition and may select a second fuel delivery mode to cause the delivery of the second fuel during a second operating condition. As a non-limiting example, the control module may select a gasoline fuel delivery mode at lower engine speeds or lower engine loads, and may select a natural gas fuel delivery mode at higher engine speeds or higher engine loads. As another example, the control module may select a natural gas fuel delivery mode at lower engine speeds or lower engine loads, and may select a gasoline fuel delivery mode at higher engine speeds or higher engine loads. As yet another example, the control module may select a natural gas fuel delivery mode at lower engine temperatures, and may select a gasoline fuel at higher engine temperatures. In some embodiments, the control module may select a fuel that has a greater availability on-board the vehicle of the other fuel or fuels (e.g., as indicated by sensors 80 and 82), thereby increasing the availability of each fuel.

In some embodiments, where only a single fuel type is utilized through injection at different locations relative to the engine cylinders, the first fuel delivery mode may include delivery of the fuel to an intake port of the engine cylinders and the second fuel delivery mode may include delivery of the fuel directly to the cylinders of the engine. As such, it should be understood that any suitable number and type of fuel delivery modes may be provided for selection by the control module.

At 314, it may be judged whether the first fuel is to be injected in response to the particular fuel delivery mode selected at 312. If the answer at 314 is judged yes, then the process flow may proceed to 316. Alternatively, if the first fuel is not to be injected, then the process flow may proceed to 318.

At 316, the method may include switching a first electrical switch to a first position (e.g., first position 122) to select a first fuel for delivery to a first cylinder of the engine via a first fuel injector. The first electrical switch may be disposed between a first electrical potential and the first fuel injector, for example, as described with reference to electrical relay system 120 of FIG. 1.

Figure 6:
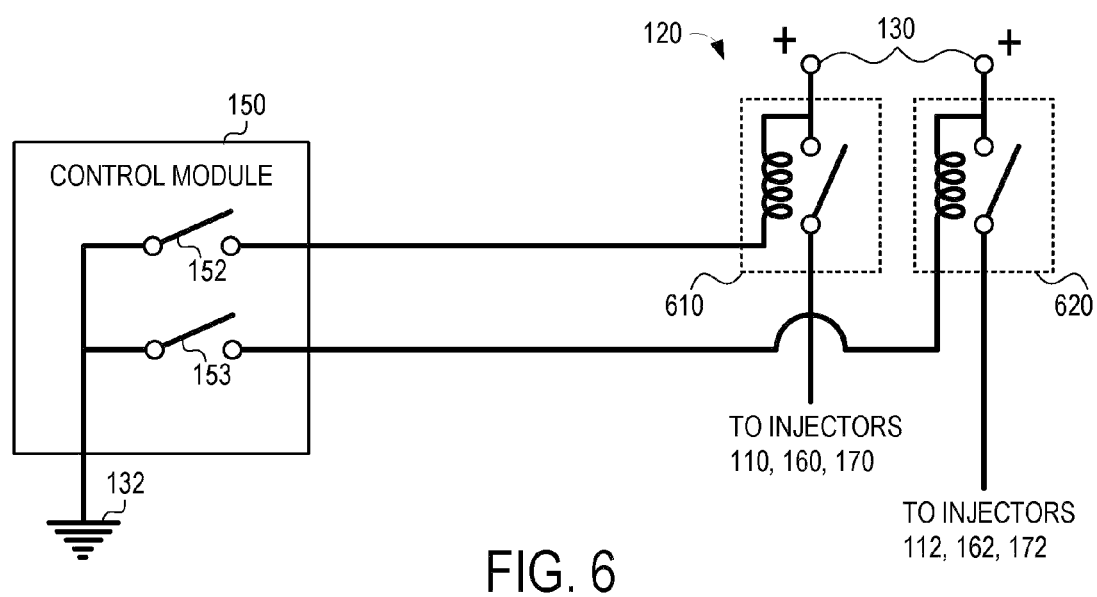
FIG. 6 shows another example embodiment of a fuel delivery system.

In some embodiments, the process flow may proceed from 316 to 322, while in other embodiments the process flow may optionally proceed to 318 as indicated by broken arrow 317. For example, where electrical relay system 120 is configured as a single pole double throw switch, only a single fuel may be selected at a given time by switching the electrical relay system between one of the first position and the second position. Hence, the process flow may proceed from 316 to 322. However, as shown in FIG. 6, electrical relay system 120 may be capable of selecting both fuel types simultaneously in some embodiments. As such, the process flow may proceed from 316 to 318 in this embodiment, since both the first fuel and the second fuel may be selected at a given instance.

At 318, it may be judged whether the second fuel is to be injected in response to the particular fuel delivery mode selected at 312. If the answer at 318 is judged yes, then the process flow may proceed to 320. Alternatively, if the second fuel is not to be injected, then the process flow may return, or in the case where the first fuel is to be injected, the process flow may proceed to 322.

At 320, the method may include switching the first electrical switch to a second position (e.g., 124) to select a second fuel for delivery to the first cylinder of the engine via a second fuel injector. The first electrical switch may be further disposed between the first electrical potential and the second fuel injector, for example, as described with reference to electrical relay system 120 of FIG. 1.

At 322, the method may include closing a second electrical switch to deliver the selected one of the first fuel or the second fuel to the first cylinder via a respective one of the first fuel injector or the second fuel injector. The second electrical switch may be disposed between a second electrical potential and each of the first fuel injector and the second fuel injector, for example, as described with reference to electronic driver 140 of FIG. 1. In this way, the method may include injecting the first fuel via the first fuel injector responsive to a first operating condition and injecting the second fuel via the second fuel injector responsive to a second operating condition in accordance with the selected fuel delivery mode. Note that in the embodiments where the electrical relay system can simultaneously select both the first fuel and the second fuel, the closing of the second electrical switch (e.g., the electronic driver) may cause both the first fuel and the second fuel to be delivered via the respective first fuel injector and second fuel injector.

As previously described with reference to FIG. 1, the first electrical potential is a voltage source and the second electrical potential is ground in at least some embodiments. As such, the first electrical switch may include a high side relay system disposed between the voltage source and a high side of each of the first fuel injector and the second fuel injector, and the second electrical switch may include a low side driver disposed between the ground and a low side of each of the first fuel injector and the second fuel injector.

As previously described with reference to fuel delivery system 100, the first fuel may include a liquid fuel and the second fuel may include a gaseous fuel. As a non-limiting example, the first fuel includes gasoline and the second fuel includes natural gas. In some embodiments, injecting the first fuel includes injecting the first fuel into an intake port of the first cylinder, and injecting the second fuel includes injecting the second fuel into the intake port of the first cylinder. However, in other embodiments, one or more of the first fuel and the second fuel may be injected directly into the first cylinder as previously described with reference to FIG. 1.

The engine may include two or more cylinders and associated fuel delivery components as previously described with reference to fuel delivery system 100. For example, in some embodiments, the method at 316 may further include switching the first electrical switch to the first position to further select the first fuel for delivery to a second cylinder of the engine via a third fuel injector (e.g., fuel injector 160). In this embodiment, the first electrical switch may be further disposed between the first electrical potential and the third fuel injector, such as previously described with reference to electrical relay system 120. The method at 320 may further include switching the first electrical switch to the second position to select the second fuel for delivery to the second cylinder of the engine via a fourth fuel injector (e.g., fuel injector 162). In this embodiment, the first electrical switch may be disposed between the first electrical potential (e.g., 130) and the fourth fuel injector. The method at 322 may further include closing a third electrical switch (e.g., electronic driver 142) to deliver the selected one of the first fuel or the second fuel to the second cylinder via a respective one of the third fuel injector or the fourth fuel injector. In this embodiment, the third electrical switch may be disposed between the second electrical potential (e.g., 132) and each of the third fuel injector and the fourth fuel injector. It should be appreciated that this method may be similarly applied to an engine including any suitable number of cylinders and associated fuel delivery components.

At 324, the method may include opening the second electrical switch (e.g., electronic driver 140) to terminate delivery of the first fuel and the second fuel to the first cylinder. At 326, the method may include combusting at least one of the first fuel and the second fuel in the first cylinder. From 326, the process flow may return to perform fuel injection for the next cycle of the first cylinder, or for other cylinders of the engine.

FIG. 4 is a flow chart depicting an example embodiment of a method for transitioning a fuel delivery system between a first fuel injector and a second fuel injector. As a non-limiting example, the method of FIG. 4 may be applied to fuel delivery system 100 of FIG. 1, and may be used in the context of engine system 200 of FIG. 2.

At 410, it may be judged whether a transition between fueling via a first fuel injector and fueling via a second fuel injector is to be performed. As previously described with reference to operation 312 of FIG. 3, the control module may select a fuel delivery mode responsive to operating conditions. Based on the selection at 312, the control module may judge at 410 whether a transition between fuel injectors is to be performed. If the answer at 410 is judged yes, the process flow may proceed to 412. Alternatively, if the answer at 410 is judged no, the process flow may return.

At 412, the fuel injection timing may be adjusted to increase a period of time during which no fuel injectors of the first electrical switch are delivering fuel. For example, the period of time may be increased by advancing or retarding a fuel injection timing of one or more of the first fuel injector and the second fuel injector relative to a fuel injection timing of one or more of the third fuel injector and the fourth fuel injector that were previously described in the context of FIGS. 1-3. By increasing this period of time between injection events of sequentially fueled cylinders, transition times of substantial duration caused by switching delays of the first electrical switch (e.g. electrical relay system 120) are less likely to interrupt one or more of the fuel injection events. However, in some embodiments, the operation at 412 may be omitted.

At 414, the method may include switching the first electrical switch between the first position and the second position while no fuel injectors of the first electrical switch are delivering fuel. In this way, a transition between fueling a particular cylinder via a first fuel injector and fueling the cylinder via a second fuel injector may be performed without interrupting a fuel injection of one of the fuel injectors associated with the first electrical switch.

As a non-limiting example, the operation at 414 may be performed by switching the first electrical switch between the first position and the second position during a period of time when neither of the first fuel injector and the second fuel injector are delivering fuel to the first cylinder and when neither of the third fuel injector and the fourth fuel injector are delivering fuel to the second cylinder. Accordingly, the operation at 412 may optionally include increasing the period of time by advancing or retarding a fuel injection timing of one or more of the first fuel injector and the second fuel injector relative to a fuel injection timing of one or more of the third fuel injector and the fourth fuel injector.

FIG. 5 is a flow chart depicting another example embodiment of a method for transitioning a fuel delivery system between a first fuel injector and a second fuel injector. As a non-limiting example, the method of FIG. 5 may be applied to fuel delivery system 100 of FIG. 1, and may be used in the context of engine system 200 of FIG. 2.

At 510, the method may optionally include adjusting the fuel flow rates and fuel pressures for both the first fuel injector and the second fuel injector of each cylinder to reduce fueling errors that may occur if a transition is performed while one or more of the fuel injectors are in the process of injecting fuel.

As a non-limiting example, the operation at 510 may be performed by adjusting a fuel injection rate associated with one the first fuel injector and the second fuel injector relative to the other of the first fuel injector and the second fuel injector by varying a fuel pump parameter so that each of the first fuel injector and the second fuel injector provide a substantially similar air-fuel mixture in the first cylinder over a given fuel injection duration. In this way, each fuel injector may be calibrated to provide a similar air-fuel mixture to a give cylinder even if a transition between two fuel injectors is performed during a fuel injection event.

The fuel injection rate associated with each fuel injector may be influenced by one or more of the fuel injection pressure and the fuel flow rate. The fuel injection pressure may be adjusted by the control module by adjusting an operating parameter of one or more fuel pumps and/or an operating parameter of one or more fuel pressure regulators. As one example, control module 150 of FIG. 2 may adjust an operating parameter of one or more of pumps 72 and 74 to increase or decrease the pressure and/or flow rate at which the first fuel is injected via fuel injector 1110. As another example, control module 150 of FIG. 2 may adjust an operating parameter of regulator 86 to increase or decrease the pressure and/or flow rate at which the second fuel is injected via second fuel injector 112.

At 512, it may be judged whether a transition between fueling via a first fuel injector and fueling via a second fuel injector is to be performed. As previously described with reference to operation 312 of FIG. 3, the control module may select a fuel delivery mode responsive to operating conditions. Based on the selection at 312, the control module may judge at 512 whether a transition between fuel injectors is to be performed. If the answer at 512 is judged yes, the process flow may proceed to 514. Alternatively, if the answer at 512 is judged no, the process flow may return.

At 514, the method may include switching the electrical relay system between the first position and the second position to perform the transition. It should be understand that in this embodiment, the electrical relay system may be switched between the first position and the second position while maintaining a desired air-fuel ratio at the cylinder. As a non-limiting example, the electrical relay system may be switched between the first position and the second position while one of the first fuel injector and the second fuel injector is delivering fuel to the first cylinder to cause the other of the first fuel injector and the second fuel injector to complete fueling of the first cylinder.

If it is judged at 516 that the transition bisects the fueling event (i.e., occurs while one of the fuel injectors is delivering fuel to the engine), then the process flow may proceed to 518. Alternatively, if the transition occurs between fueling events (i.e., during a period of time when no fuel injector is injecting fuel), the process flow may return.

At 518, the method may optionally include extending or shortening the pulse width of the initiated fueling event to increase or decrease the amount of fuel delivered to the cylinder by the fuel injector that was transitioned to by the control module from the other fuel injector associated with the cylinder. For example, if the first fuel injector is delivering fuel to the first cylinder when the transition is performed to the second fuel injector (e.g., through switching electrical relay system 120 via switch 152), the control module may increase or decrease the pulse width of the second fuel injector to correct air-fuel errors. In this way, air-fuel errors that were not sufficiently resolved at 510 through adjustment of the fuel injection rates may be reduced or eliminated by adjustment of the bisected fueling event.

FIG. 6 illustrates an alternative embodiment of the electrical relay system 120 of FIG. 1. In the embodiment of FIG. 6, electrical relay system 120 includes a first relay switch 610 disposed between the first electrical potential 1230 and the first fuel injector 110 (among other fuel injectors, such as e.g., 160 and 170), a second relay switch 620 disposed between the first electrical potential 130 and the second fuel injector 112 (among other fuel injectors, such as e.g., 162 and 164). Accordingly, the first position for selecting the first fuel includes closing the first relay switch 610 to electrically couple the first electrical potential to the first fuel injector. The first relay switch may be opened and closed via manipulation of switch 152. Similarly, the second position for selecting the second fuel includes closing the second relay switch 620 to electrically couple the first electrical potential to the second fuel injector. The second relay switch may be opened and closed via manipulation of switch 153. The embodiment of FIG. 6 provides an advantage over the embodiment of FIG. 1 in that it the control module can cause the fuel delivery system to simultaneously deliver fuel to a given cylinder via two different injectors. It should be appreciated that the embodiment of the electrical relay system shown in FIG. 6 may be used instead of the embodiment of FIG. 1 with respect to the various example embodiments described herein with respect to FIGS. 1-5.

Note that the example control and estimation routines included herein can be used with various fuel system, engine system, and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control module.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel delivery system for an engine, comprising:
a first fuel injector configured to deliver a first fuel to a first cylinder of the engine;
a second fuel injector configured to deliver a second fuel to the first cylinder of the engine;
an electrical relay system disposed between a first electrical potential and each of the first fuel injector and the second fuel injector;
an electronic driver disposed between a second electrical potential and each of the first fuel injector and the second fuel injector;
a control module configured to:
switch the electrical relay system to a first position to select the first fuel for delivery to the engine, the first position electrically coupling the first electrical potential to the first fuel injector;
switch the electrical relay system to a second position to select the second fuel for delivery to the engine, the second position electrically coupling the first electrical potential to the second fuel injector; and
close the electronic driver to deliver the selected one of the first fuel or the second fuel to the first cylinder via a respective one of the first fuel injector or the second fuel injector;
adjust a fuel injection rate associated with one of the first fuel injector and the second fuel injector relative to the other of the first fuel injector and the second fuel injector by varying a fuel pump parameter so that each of the first fuel injector and the second fuel injector provide a substantially similar air-fuel mixture in the first cylinder over a given fuel injection duration; and
switch the electrical relay system between the first position and the second position while one of the first fuel injector and the second fuel injector is delivering fuel to the first cylinder to cause the other of the first fuel injector and the second fuel injector to complete fueling of the first cylinder.

2. The fuel delivery system of claim 1, wherein the first fuel injector is configured to inject a liquid fuel and wherein the second fuel injector is configured to inject a gaseous fuel.

3. The fuel delivery system of claim 2, wherein the first fuel includes gasoline and wherein the second fuel includes natural gas.

4. The fuel delivery system of claim 1, wherein the first fuel injector is arranged at an intake port of the first cylinder, and wherein the second fuel injector is arranged at the intake port of the first cylinder.

5. The fuel delivery system of claim 1, wherein the control module is further configured to:
vary the fuel type that is combusted in the first cylinder between the first fuel and second fuel responsive to an operating condition of the engine by switching the electrical relay system between the first position and the second position.

6. The fuel delivery system of claim 1, wherein the control module is further configured to:
extend or shorten a pulse width of an initiated fueling event to reduce fueling error.

7. The fuel delivery system of claim 1, further comprising:
a third fuel injector configured to deliver the first fuel to a second cylinder of the engine;
a fourth fuel injector configured to deliver the second fuel to the second cylinder of the engine; and
a second electronic driver disposed between the second electrical potential and each of the third fuel injector and the fourth fuel injector;
wherein the electrical relay system is further disposed between the first electrical potential and each of the third fuel injector and the fourth fuel injector, the first position electrically coupling the first electrical potential to the third fuel injector and the second position electrically coupling the first electrical potential to the fourth fuel injector; and wherein the control module is further configured to close the second electronic driver to deliver the selected one of the first fuel or the second fuel to the second cylinder via a respective one of the third fuel injector or the fourth fuel injector.

8. A fuel delivery system for an engine, comprising:
a first fuel injector configured to deliver a first fuel to a first cylinder of the engine;
a second fuel injector configured to deliver a second fuel to the first cylinder of the engine;
a third fuel injector configured to deliver the first fuel to a second cylinder of the engine;
a fourth fuel injector configured to deliver the second fuel to the second cylinder of the engine;
a first electronic driver disposed between a second electrical potential and each of the first fuel injector and the second fuel injector;
a second electronic driver disposed between the second electrical potential and each of the third fuel injector and the fourth fuel injector;
an electrical relay system disposed between a first electrical potential and each of the first fuel injector and the second fuel injector, wherein the electrical relay system is further disposed between the first electrical potential and each of the third fuel injector and the fourth fuel injector, the electrical relay system including a first position electrically coupling the first electrical potential to the first and third fuel injectors and the electrical relay system including a second position electrically coupling the first electrical potential to the second and fourth fuel injectors;
a control module configured to:
switch the electrical relay system to the first position to select the first fuel for delivery to the engine;
switch the electrical relay system to the second position to select the second fuel for delivery to the engine;
close the first electronic driver to deliver the selected one of the first fuel or the second fuel to the first cylinder via a respective one of the first fuel injector or the second fuel injector;
close the second electronic driver to deliver the selected one of the first fuel or the second fuel to the second cylinder via a respective one of the third fuel injector or the fourth fuel injector; and
switch the electrical relay system between the first position and the second position during a period of time when neither of the first fuel injector and the second fuel injector are delivering fuel to the first cylinder and when neither of the third fuel injector and the fourth fuel injector are delivering fuel to the second cylinder.

9. The fuel delivery system of claim 8, where the control module is further configured to increase the period of time by advancing or retarding a fuel injection timing of one or more of the first fuel injector and the second fuel injector relative to a fuel injection timing of one or more of the third fuel injector and the fourth fuel injector.

10. The fuel delivery system of claim 9, where the electrical relay system is configured as a single pole double throw switch; and
wherein the control module is configured to open the electronic driver to terminate delivery of the selected one of the first fuel or the second fuel to the first cylinder via the respective one of the first fuel injector or the second fuel injector.

11. The fuel delivery system of claim 9, where the electrical relay system includes:
a first relay switch disposed between the first electrical potential and the first fuel injector; and
a second relay switch disposed between the first electrical potential and the second fuel injector;
wherein the first position for selecting the first fuel includes closing the first relay switch to electrically couple the first electrical potential to the first fuel injector, and wherein the second position for selecting the second fuel includes closing the second relay switch to electrically couple the first electrical potential to the second fuel injector.

12. The fuel delivery system of claim 9, wherein each of the first fuel injector and the second fuel injector are saturating type fuel injectors;
wherein the electronic driver is a saturating type driver including a transistor for opening and closing an electrical coupling between the second electrical potential and each of the first fuel injector and the second fuel injector;
where the first electrical potential is a voltage source and wherein the second electrical potential is ground;
where the electrical relay system is a high side relay system disposed between the voltage source and a high side of each of the first fuel injector and the second fuel injector; and
where the electronic driver is a low side driver disposed between the ground and a low side of each of the first fuel injector and the second fuel injector.

13. A method of operating a fuel delivery system for an engine, comprising:
switching a first electrical switch to a first position to select a first fuel for delivery to a first cylinder of the engine via a first fuel injector, the first electrical switch disposed between a first electrical potential and the first fuel injector;
switching the first electrical switch to a second position to select a second fuel for delivery to the first cylinder of the engine via a second fuel injector, the first electrical switch disposed between the first electrical potential and the second fuel injector, the switching of the first electrical switch bisecting a fueling event of the first cylinder; and
closing a second electrical switch to deliver the selected one of the first fuel or the second fuel to the first cylinder via a respective one of the first fuel injector or the second fuel injector, the second electrical switch disposed between a second electrical potential and each of the first fuel injector and the second fuel injector, the closing the second electrical switch including extending or shortening an injection pulse width to reduce fueling error in response to the switching of the first electrical switch.

14. The method of claim 13, further comprising:
injecting the first fuel via the first fuel injector responsive to a first operating condition, the first fuel including a liquid fuel;
injecting the second fuel via the second fuel injector responsive to a second operating condition, the second fuel including a gaseous fuel; and
combusting at least one of the liquid fuel and the gaseous fuel in the first cylinder.

15. The method of claim 13, further comprising:
opening the second electrical switch to terminate delivery of the first fuel and the second fuel to the first cylinder.

16. The method of claim 13, further comprising:
switching the first electrical switch to the first position to further select the first fuel for delivery to a second cylinder of the engine via a third fuel injector, the first electrical switch further disposed between the first electrical potential and the third fuel injector;
switching the first electrical switch to the second position to select the second fuel for delivery to the second cylinder of the engine via a fourth fuel injector, the first electrical switch disposed between the first electrical potential and the fourth fuel injector; and
closing a third electrical switch to deliver the selected one of the first fuel or the second fuel to the second cylinder via a respective one of the third fuel injector or the fourth fuel injector, the third electrical switch disposed between the second electrical potential and each of the third fuel injector and the fourth fuel injector.

17. A method of operating a fuel delivery system for an engine, comprising:
switching a first electrical switch to a first position to select a first fuel for delivery to a first cylinder of the engine via a first fuel injector, the first electrical switch disposed between a first electrical potential and the first fuel injector;
switching the first electrical switch to a second position to select a second fuel for delivery to the first cylinder of the engine via a second fuel injector, the first electrical switch disposed between the first electrical potential and the second fuel injector, the switching of the first electrical switch bisecting a fueling event of the first cylinder; and
closing a second electrical switch to deliver the selected one of the first fuel or the second fuel to the first cylinder via a respective one of the first fuel injector or the second fuel injector, the second electrical switch disposed between a second electrical potential and each of the first fuel injector and the second fuel injector
switching the first electrical switch to the first position to further select the first fuel for delivery to a second cylinder of the engine via a third fuel injector, the first electrical switch further disposed between the first electrical potential and the third fuel injector;
switching the first electrical switch to the second position to select the second fuel for delivery to the second cylinder of the engine via a fourth fuel injector, the first electrical switch disposed between the first electrical potential and the fourth fuel injector;
closing a third electrical switch to deliver the selected one of the first fuel or the second fuel to the second cylinder via a respective one of the third fuel injector or the fourth fuel injector, the third electrical switch disposed between the second electrical potential and each of the third fuel injector and the fourth fuel injector; and
switching the first electrical switch between the first position and the second position during a period of time when neither of the first fuel injector and the second fuel injector are delivering fuel to the first cylinder and when neither of the third fuel injector and the fourth fuel injector are delivering fuel to the second cylinder.

18. The method of claim 17, further comprising:
increasing the period of time by advancing or retarding a fuel injection timing of one or more of the first fuel injector and the second fuel injector relative to a fuel injection timing of one or more of the third fuel injector and the fourth fuel injector.

19. A method of operating a fuel delivery system for an engine, comprising:
switching a first electrical switch to a first position to select a first fuel for delivery to a first cylinder of the engine via a first fuel injector, the first electrical switch disposed between a first electrical potential and the first fuel injector;
switching the first electrical switch to a second position to select a second fuel for delivery to the first cylinder of the engine via a second fuel injector, the first electrical switch disposed between the first electrical potential and the second fuel injector; and
closing a second electrical switch to deliver the selected one of the first fuel or the second fuel to the first cylinder via a respective one of the first fuel injector or the second fuel injector, the second electrical switch disposed between a second electrical potential and each of the first fuel injector and the second fuel injector;
adjusting a fuel injection rate associated with one of the first fuel injector and the second fuel injector relative to the other of the first fuel injector and the second fuel injector by varying a fuel pump parameter so that each of the first fuel injector and the second fuel injector provide a substantially similar air-fuel mixture in the first cylinder over a given fuel injection duration; and
switching an electrical relay system between a first position and a second position while one of the first fuel injector and the second fuel injector is delivering fuel to the first cylinder to cause the other of the first fuel injector and the second fuel injector to complete fueling of the first cylinder.

20. A fuel delivery system for an engine, comprising:
a first fuel injector configured to deliver a liquid fuel to a first cylinder of the engine;
a second fuel injector configured to deliver a gaseous fuel to the first cylinder of the engine;
a third fuel injector configured to deliver the liquid fuel to a second cylinder of the engine;
a fourth fuel injector configured to deliver the gaseous fuel to the second cylinder of the engine; and
a high side relay system disposed between a voltage source and a high side of each of the first fuel injector, second fuel injector, the third fuel injector, and the fourth fuel injector;
a first low side driver disposed between ground and a low side of each of the first fuel injector and the second fuel injector;
a second low side driver disposed between the ground and a low side of each of the third fuel injector and the fourth fuel injector; and
a control module configured to:
switch the high side relay system to a first position to select the liquid fuel for delivery to the engine, the first position electrically coupling the voltage source to each of the first fuel injector and the third fuel injector;

switch the high side relay system to a second position to select the gaseous fuel for delivery to the engine, the second position electrically coupling the voltage source to each of the second fuel injector and the fourth fuel injector;

close the first low side driver to deliver the selected one of the liquid fuel or the gaseous fuel to the first cylinder via a respective one of the first fuel injector or the second fuel injector, where the first low side driver electrically couples the ground to each of the first fuel injector and the second fuel injector when closed;

close the second low side driver to deliver the selected one of the liquid fuel or the gaseous fuel to the second cylinder via a respective one of the third fuel injector or the fourth fuel injector, where the second low side driver electrically couples the ground to each of the third fuel injector and fourth fuel injector when closed; and extend or shorten a fuel pulse width of a fueling event in response to switching the high side relay bisecting a fueling event.

* * * * *